United States Patent
Talekar

(10) Patent No.: US 11,899,709 B2
(45) Date of Patent: *Feb. 13, 2024

(54) METHODS, SYSTEMS, AND MEDIA FOR GENERATING A GROUP OF MEDIA CONTENT ITEMS

(71) Applicant: Google LLC, Mountain View, CA (US)

(72) Inventor: Alok Talekar, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,871

(22) Filed: Jun. 24, 2022

(65) Prior Publication Data
US 2022/0318291 A1    Oct. 6, 2022

Related U.S. Application Data

(63) Continuation of application No. 15/627,808, filed on Jun. 20, 2017, now Pat. No. 11,372,910.

(51) Int. Cl.
*G06F 16/438* (2019.01)
*G06F 16/28* (2019.01)
(Continued)

(52) U.S. Cl.
CPC ........ *G06F 16/4387* (2019.01); *G06F 16/285* (2019.01); *G06F 16/435* (2019.01); *G06F 16/68* (2019.01); *G06F 16/687* (2019.01)

(58) Field of Classification Search
CPC .. G06F 16/4387; G06F 16/435; G06F 16/285; G06F 16/68; G06F 16/687
See application file for complete search history.

(56) References Cited

U.S. PATENT DOCUMENTS 8,239,418 B1    8/2012 Baluja et al.
8,649,613 B1    2/2014 Leung et al.
(Continued)

FOREIGN PATENT DOCUMENTS

WO    WO 2004008348    1/2004
WO    WO 2016083905    6/2016

OTHER PUBLICATIONS

Chattopadhyay, C. & Maurya, A. K., "Genre-Specific Modeling of Visual Features for Efficient Content Based Video Shot Classification and Retrieval", In International Journal of Multimedia Information Retrieval, vol. 2, No. 4, Mar. 2013, pp. 1-9.
(Continued)

*Primary Examiner* — Kris E Mackes
*Assistant Examiner* — Lin Lin M Htay
(74) *Attorney, Agent, or Firm* — Shumaker & Sieffert, P.A.

(57) ABSTRACT

Methods, systems, and media for generating a group of media content items are provided. In some embodiments, the method comprises: receiving, from a server, a plurality of media content items; storing, on a user device, the plurality of media content items; determining, by the user device, whether to request a clustering of the plurality of media content items; in response to determining that a request for clustering the plurality of media content items is to be made, transmitting the request to the server, wherein the request includes indications of the plurality of media content items; receiving, from the server, a plurality of clusters corresponding to the plurality of media content items; and causing indications of the plurality of media content items to be presented in a user interface on the user device, wherein the indications of the plurality of media content items are organized based on the plurality of clusters.

21 Claims, 5 Drawing Sheets

(51) Int. Cl.
  *G06F 16/435* (2019.01)
  *G06F 16/68* (2019.01)
  *G06F 16/687* (2019.01)

(56) References Cited

U.S. PATENT DOCUMENTS

| | | | |
|---|---|---|---|
| 9,769,030 B1* | 9/2017 | Ramalingam | H04L 67/535 |
| 2004/0143604 A1 | 7/2004 | Glenner et al. | |
| 2009/0132508 A1 | 5/2009 | Skowronek | |
| 2009/0164247 A1* | 6/2009 | Dobler | G06Q 10/10 |
| | | | 705/3 |
| 2011/0035705 A1 | 2/2011 | Faenger et al. | |
| 2011/0060738 A1 | 3/2011 | Gates et al. | |
| 2014/0040262 A1 | 2/2014 | Winter et al. | |
| 2014/0280140 A1 | 9/2014 | Ling et al. | |
| 2014/0282179 A1 | 9/2014 | Grossman et al. | |
| 2015/0156247 A1* | 6/2015 | Hensel | H04L 67/06 |
| | | | 709/219 |
| 2015/0301693 A1 | 10/2015 | Wheeler et al. | |
| 2016/0055164 A1* | 2/2016 | Cantarero | G06F 16/447 |
| | | | 707/740 |
| 2016/0147749 A1* | 5/2016 | Chandraghatgi | G06F 16/951 |
| | | | 705/14.73 |
| 2017/0255619 A1* | 9/2017 | Raichelgauz | H04L 63/08 |

OTHER PUBLICATIONS

International Search Report and Written Opinion dated Jun. 26, 2018 in International Patent Application No. PCT/US2018/022313.
Notice of Allowance dated Feb. 28, 2022 in U.S. Appl. No. 15/627,808.
Office Action dated Jan. 22, 2020 in U.S. Appl. No. 15/627,808.
Office Action dated May 15, 2020 in U.S. Appl. No. 15/627,808.
Office Action dated Jul. 10, 2019 in U.S. Appl. No. 15/627,808.
Office Action dated Sep. 28, 2021 in U.S. Appl. No. 15/627,808.
Office Action dated Oct. 20, 2020 in U.S. Appl. No. 15/627,808.

* cited by examiner

METHODS, SYSTEMS, AND MEDIA FOR GENERATING A GROUP OF MEDIA CONTENT ITEMS

CROSS-REFERENCE TO RELATED APPLICATION

This application is a continuation of U.S. patent application Ser. No. 15/627,808, filed Jun. 20, 2017, which is hereby incorporated by reference herein in its entirety.

TECHNICAL FIELD

The disclosed subject matter relates to methods, systems, and media for generating a group of media content items.

BACKGROUND

Many users want to download media content items (e.g., videos, music, audiobooks, etc.) from media content providers to their user devices (e.g., mobile phones, tablet computers, etc.). However, it can be difficult for these users to browse through their downloaded content, particularly when many content items pertaining to different topics have been downloaded. For example, episodes of a television show may be interspersed with music videos when listed on the user's device, thereby making it difficult for users to find content that they are looking for.

Accordingly, it is desirable to provide methods, systems, and media for generating a group of media content items.

SUMMARY

Methods, systems, and media for generating a group of media content items are provided.

In accordance with some embodiments of the disclosed subject matter, a method for grouping content items is provided, the method comprising: receiving, from a server, a plurality of media content items; storing, on a user device, the plurality of media content items; determining, by the user device, whether to request a clustering of the plurality of media content items by the server; in response to determining that a request for clustering the plurality of media content items is to be made, transmitting the request to the server, wherein the request includes indications of the plurality of media content items; receiving, from the server, a plurality of clusters corresponding to the plurality of media content items; and causing indications of the plurality of media content items to be presented in a user interface on the user device, wherein the indications of the plurality of media content items are organized based on the plurality of clusters.

In some embodiments, each cluster of the plurality of clusters includes more than a threshold number of media content items of the plurality of media content items.

In some embodiments, the user interface includes a selectable input to select all media content items of the plurality of media content items assigned to a cluster of the plurality of clusters.

In some embodiments, determining whether to request the clustering of the plurality of media content items is based on whether a number of media content items in the plurality of media content items exceeds a predetermined threshold.

In some embodiments, determining whether to request the clustering of the plurality of media content items is based on a duration of time elapsed since a previous clustering of a second plurality of media content items.

In some embodiments, the request includes indications of a second plurality of clusters corresponding to the previous clustering of the second plurality of media content items.

In accordance with some embodiments of the disclosed subject matter, a system for grouping content items is provided, the system comprising: a memory; and a hardware processor that, when executing computer-executable instructions stored in the memory, is configured to: receive, from a server, a plurality of media content items; store, in the memory, the plurality of media content items; determine whether to request a clustering of the plurality of media content items by the server; in response to determining that a request for clustering the plurality of media content items is to be made, transmit the request to the server, wherein the request includes indications of the plurality of media content items; receive, from the server, a plurality of clusters corresponding to the plurality of media content items; and cause indications of the plurality of media content items to be presented in a user interface on a display, wherein the indications of the plurality of media content items are organized based on the plurality of clusters.

In accordance with some embodiments of the disclosed subject matter, a non-transitory computer-readable medium storing computer-executable instructions that, when executed by a hardware processor, cause the processor to perform a method for grouping media content is provided, the method comprising: receiving, from a server, a plurality of media content items; storing, on a user device, the plurality of media content items; determining, by the user device, whether to request a clustering of the plurality of media content items by the server; in response to determining that a request for clustering the plurality of media content items is to be made, transmitting the request to the server, wherein the request includes indications of the plurality of media content items; receiving, from the server, a plurality of clusters corresponding to the plurality of media content items; and causing indications of the plurality of media content items to be presented in a user interface on the user device, wherein the indications of the plurality of media content items are organized based on the plurality of clusters.

In accordance with some embodiments of the disclosed subject matter, a system for grouping content items is provided, the system comprising: means for receiving, from a server, a plurality of media content items; means for storing, on a user device, the plurality of media content items; means for determining, by the user device, whether to request a clustering of the plurality of media content items by the server; means for transmitting the request to the server, wherein the request includes indications of the plurality of media content items in response to determining that a request for clustering the plurality of media content items is to be made; means for receiving, from the server, a plurality of clusters corresponding to the plurality of media content items; and means for causing indications of the plurality of media content items to be presented in a user interface on the user device, wherein the indications of the plurality of media content items are organized based on the plurality of clusters.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
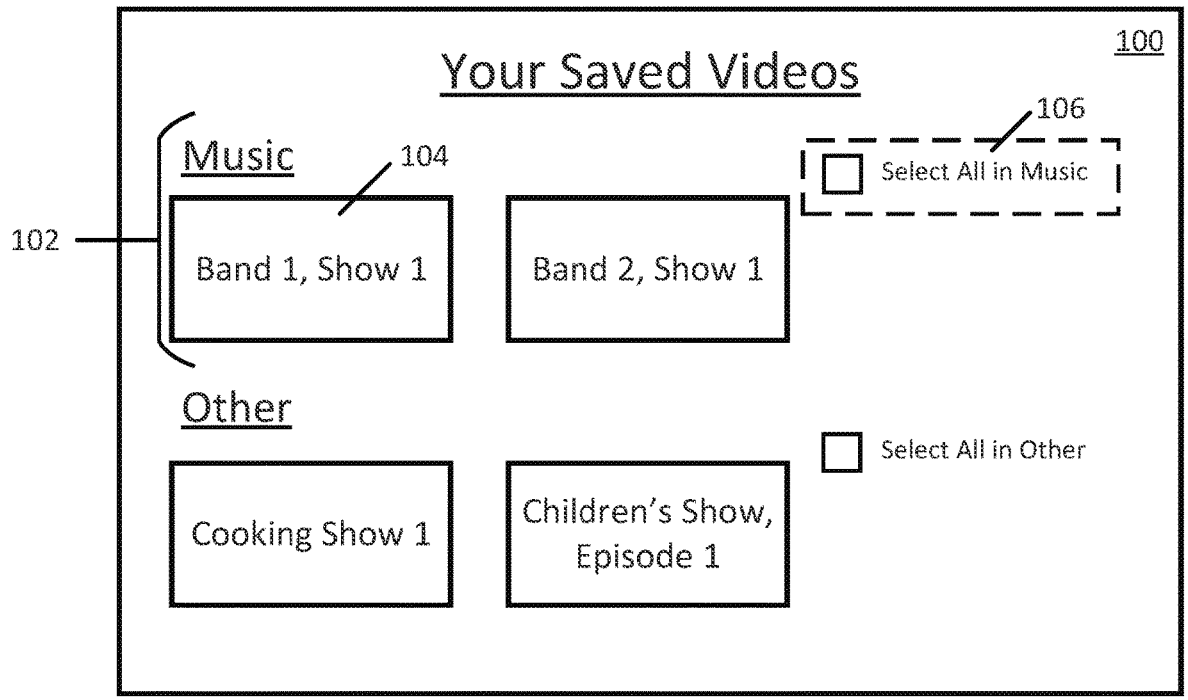
FIGS. 1A and 1B show examples of user interfaces for presenting indications of content items organized by category in accordance with some embodiments of the disclosed subject matter.

In accordance with various embodiments, mechanisms (which can include methods, systems, and media) for generating a group of media content items are provided.

In some embodiments, the mechanisms described herein can cause a user device to receive a group of media content items, and request, from a server, a clustering corresponding to the media content items. The user device can then cause a user interface to be presented that includes indications of the media content items organized based on the clusters assigned to each of the media content items. In some embodiments, the received media content items can be media content items that have been downloaded from a content server for offline viewing on the user device. Furthermore, in some embodiments, the user interface can include user interface elements that allow a user to select all of the media content items in a cluster. The user interface can then allow the user to perform an action with the selected media content items, such as share the selected media content items with a contact (e.g., via a peer-to-peer network connection, via a message, via a social networking service, and/or in any other suitable manner), delete the selected media content items, move the selected media content items to a different location on the user device, and/or perform any other suitable action.

In some embodiments, the mechanisms can cluster the media content items in the group of media content items based on metadata associated with each media content item. For example, in some embodiments, the metadata can include a topic associated with the corresponding media content item, and the mechanisms can cluster the media content items based on topic. In some embodiments, the metadata can indicate a category and a sub-category associated with a particular media content item, and the mechanisms can cluster the media content items using the category and/or the sub-category. For example, in an instance where a media content item is a tutorial about knitting, the corresponding metadata can indicate a category of "tutorial" and a sub-category of "knitting." In some embodiments, the media content item can be presented within the user interface as belonging to a tutorials category, for example, if there are not enough media content items belonging to a knitting sub-category. Alternatively, in instances where there are more than a pre-determined number of media content items belonging to a particular sub-category, the media content items from the sub-category can be grouped together in the user interface.

In some embodiments, the metadata can be determined in any suitable manner and using any suitable technique(s). For example, in some embodiments, the metadata can be determined by a content server hosting the media content items based on any suitable features associated with the media content. As a more particular example, in some embodiments, the features can include image content of the media content item, audio content of the media content item, and/or any other suitable content, as described below in connection with FIG. 4.

Turning to FIG. 1A, an example 100 of a user interface for presenting indications of content items organized by categories in shown in accordance with some embodiments of the disclosed subject matter. As illustrated, user interface 100 can include a category 102, indications of content items, such as video 104, and a bulk select input 106. Note that, in some embodiments, user interface 100 can include any suitable number of categories (e.g., one, two, five, ten, twenty, and/or any other suitable number) and any suitable number of content items (e.g., one, two, five, ten, twenty, and/or any other suitable number) of content items within each category.

In some embodiments, category 102 can be any suitable category to which one or more content items can belong. For example, as shown in FIG. 1A can correspond to "music," and video 104, included in category 102, can be a music video, an audio recording of a piece of music, and/or any other suitable content belonging to a music category. In some embodiments, category 102 can relate to any other suitable content categories, for example, "television shows," "children's shows," "documentaries," "news," any suitable keyword or topic, and/or any other suitable category.

In some embodiments, category 102 can be identified by a user device presenting user interface 100 as shown in and described below in connection with FIGS. 4 and 5. For example, in some embodiments category 102 can be determined by clustering metadata associated with a group of media content items to identify one or more categories to which the group of media content items belong.

In some embodiments, user interface 100 can include bulk select input 106 that, when selected, can cause all of the content items included in the corresponding category (e.g., category 102) to be selected. In some such embodiments, user interface 100 can then allow any suitable action to be performed on the selected content items, such as sharing the selected content items with a contact (e.g., via a peer-to-peer network connection, via a social networking page, and/or in any other suitable manner), deleting the selected content items, moving the selected content items to a different location on the user device, and/or performing any other suitable actions. In some embodiments, bulk select input 106 can be omitted.

Figure 1B:
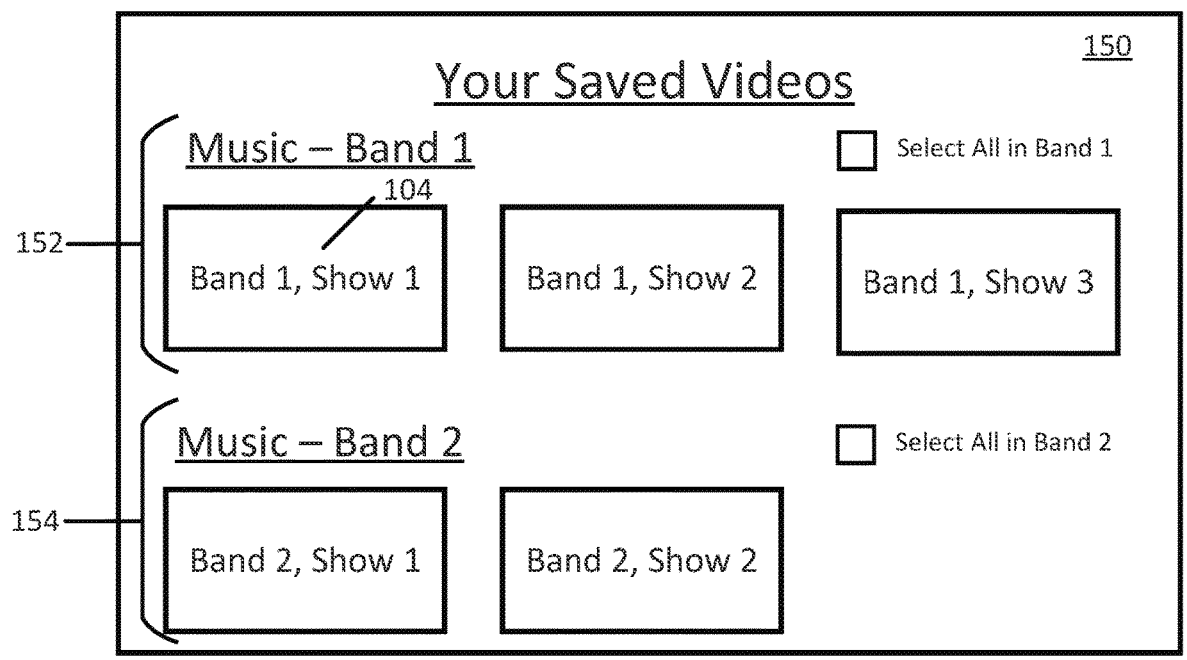

In some embodiments, category 102 can be further divided into any suitable number of sub-categories. For example, as described below in connection with FIG. 5, if, while clustering the group of media content items, the user device determines that the media content items can be divided into clusters that form sub-categories of a larger category, the content items can be presented within the sub-categories, as shown in a user interface 150 of FIG. 1B. As illustrated, user interface 150 can include sub-categories 152 and 154. In particular, category 102 of FIG. 1A ("music") can be divided into sub-category 152 corresponding to "Band 1" and sub-category 154 corresponding to "Band 2." As illustrated in FIG. 1B, individual content items within each sub-category can be presented as belonging to the sub-category. For example, as shown in FIG. 1B, video 104, corresponding to music by "Band 1," can be presented within sub-category 152 in user interface 150.

Figure 2:
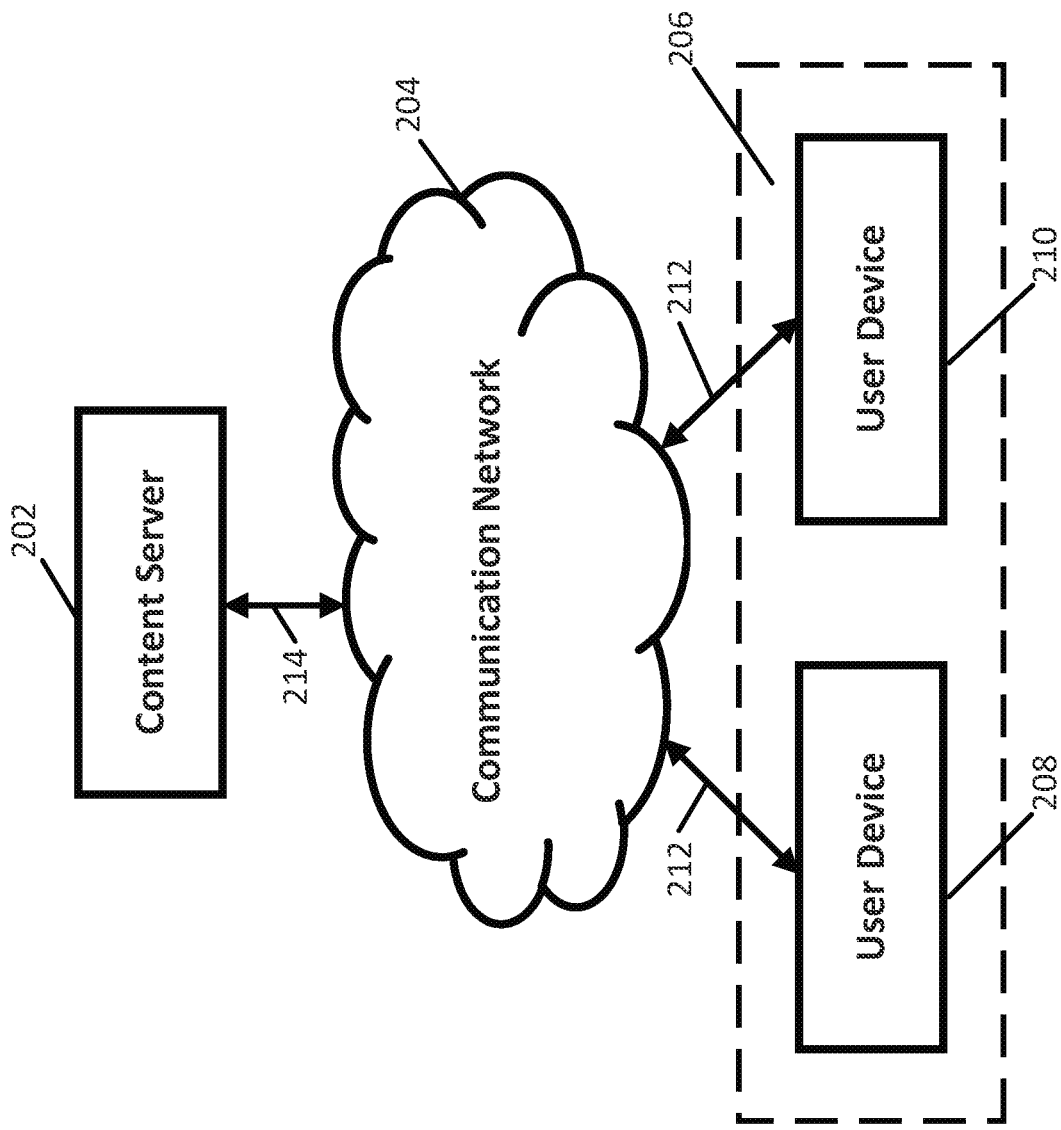
FIG. 2 shows a schematic diagram of an illustrative system suitable for implementation of mechanisms described herein for generating a group of media content items in accordance with some embodiments of the disclosed subject matter.

Turning to FIG. 2, an illustrative example 200 of hardware for generating groups of media content items that can be used in accordance with some embodiments of the disclosed subject matter is shown. As illustrated, hardware 200 can include one or more servers such as a content server 202, a communication network 204, and/or one or more user devices 206, such as user devices 208 and 210.

In some embodiments, content server 202 can be any suitable server for storing content and transmitting the content to a user device for presentation, clustering content items in response to a request from user device 206, and/or performing any other suitable function(s). For example, in some embodiments, content server 202 can be a server that transmits media content to user device 206 via communication network 204. In some embodiments, the content on content server 202 can be any suitable content, such as video content, audio content, movies, television programs, live-streamed content, audiobooks, and/or any other suitable type of content. As another example, in some embodiments, content server 202 can receive a request from user device 206 to cluster content items stored on user device 206, and content server 202 can cluster the content items based on any suitable metadata, as shown in and described below in connection with FIG. 4. In some embodiments, content server 202 can be omitted.

Note that, in some embodiments, user device 208 and user device 210 can communicate with each other to, for example, transmit media content items from one user device to the other user device. In some such embodiments, user device 208 and user device 210 can communicate in any suitable manner, for example, via an ad-hoc WiFi network, via a BLUETOOTH network, via audio data transmitted from one user device to the other user device (e.g., in a sub-audible range, and/or in any other suitable audio frequency), via optical communication (e.g., using a camera associated with user device 208 and/or user device 210), and/or in any other suitable manner.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to content server 202. Communications links 212 and/or 214 can be any communications links suitable for communicating data among user devices 206 and server 202 such as network links, dial-up links, wireless links, hard-wired links, any other suitable communications links, or any suitable combination of such links.

In some embodiments, user devices 206 can include one or more computing devices suitable for storing media content items, viewing media content items, and/or any other suitable functions. For example, in some embodiments, user devices 206 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although content server 202 is illustrated as a single device, the functions performed by content server 202 can be performed using any suitable number of devices in some embodiments. For example, in some embodiments, multiple devices can be used to implement the functions performed by content server 202.

Although two user devices 208 and 210 are shown in FIG. 2, any suitable number of user devices, and/or any suitable types of user devices, can be used in some embodiments.

Figure 3:
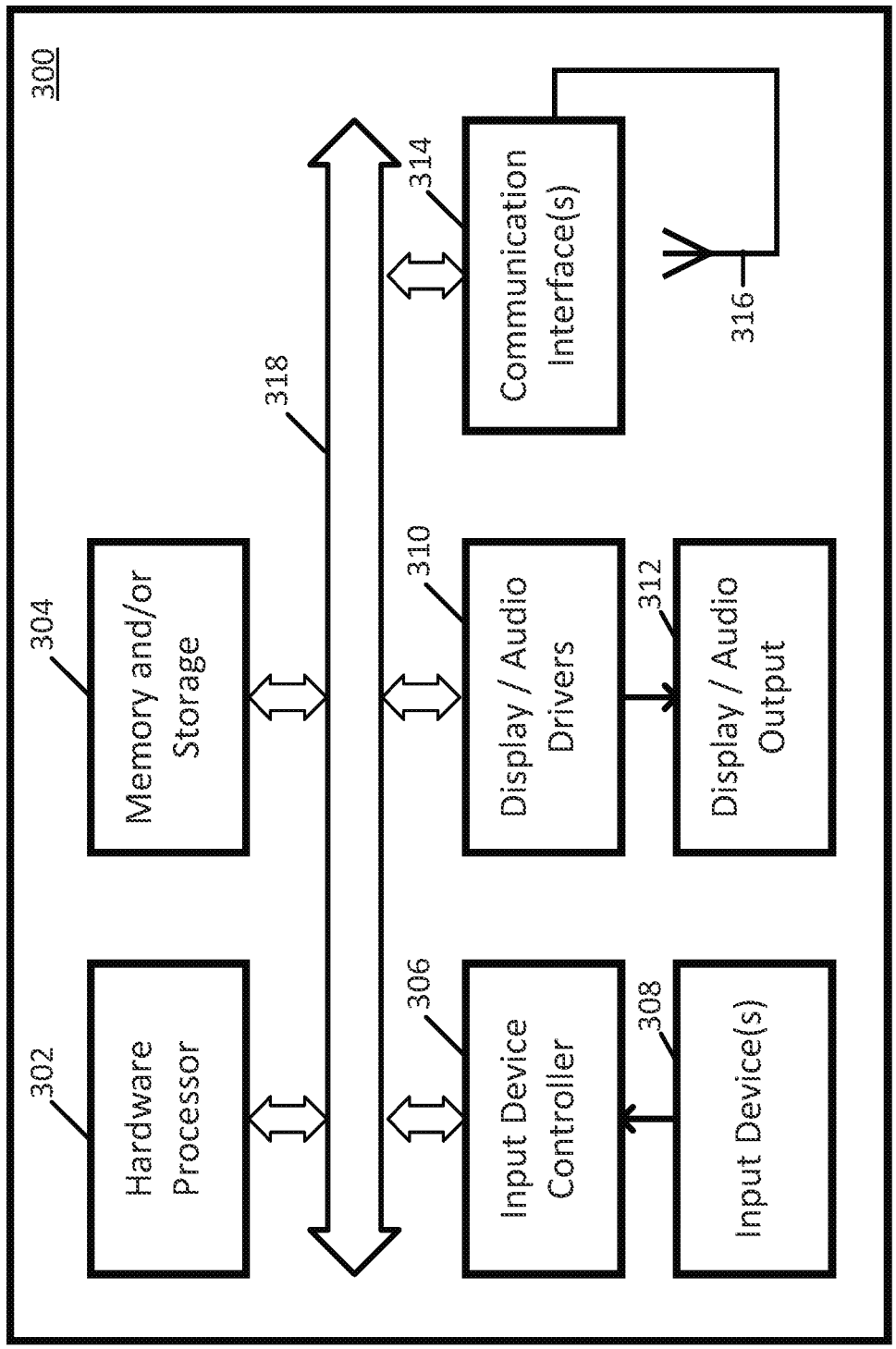
FIG. 3 shows a detailed example of hardware that can be used in a server and/or a user device of FIG. 2 in accordance with some embodiments of the disclosed subject matter.

Content server 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, the server program can cause hardware processor 302 of content server 202 to identify features of a media content item (as described below in connection with FIG. 4), store identified features as metadata associated with the media content item, cluster a group of media content items based on metadata associated with the media content items, and/or perform any other suitable functions. In some embodiments, hardware processor 302 can be controlled by a computer program stored in memory and/or storage 304 of user device 206. For example, the computer program can cause hardware processor 302 of user device 206 to receive media content items and associated metadata, transmit a request to server 202 for clusters corresponding to a group of media content items, present indications of the media content items in a user interface organized by clusters, and/or perform any other suitable functions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry. As a more particular example, in some embodiments, communication interface(s) 314 can be circuitry for BLUETOOTH communication, WiFi communication, and/or communication via any other suitable type of communication network, as described above.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
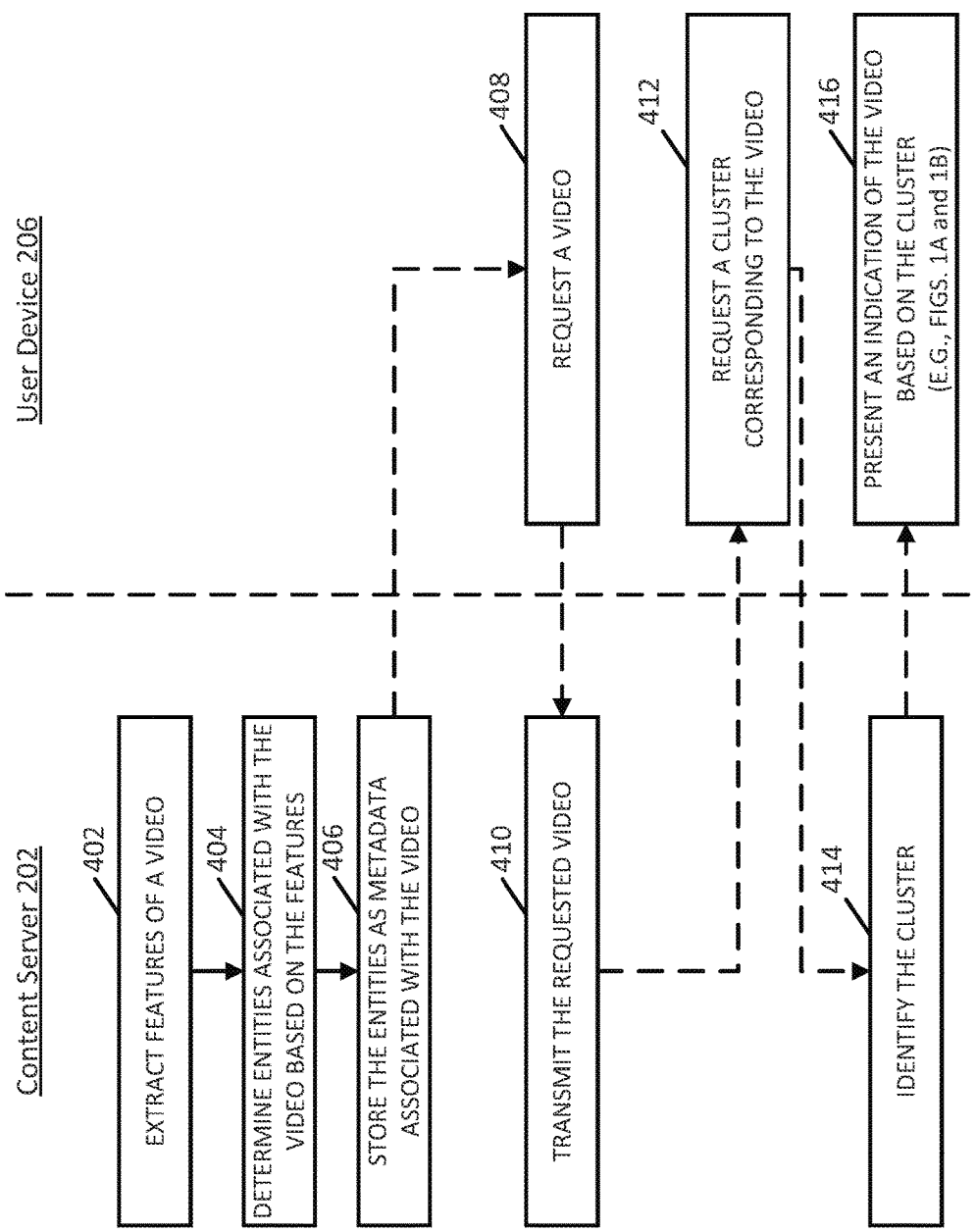
FIG. 4 shows an illustrative example of an information flow diagram for generating a group of media content items in accordance with some embodiments of the disclosed subject matter.

Turning to FIG. 4, an illustrative example 400 of an information flow diagram for generating groups of media content items is shown in accordance with some embodiments of the disclosed subject matter. As shown, blocks of information flow diagram 400 can be performed on content server 202 and/or user device 206.

At 402, content server 202 can extract features of a media content item. For example, in instances where the content item is a video, content server 202 can analyze image content of the video, audio content of the video, and/or perform any other suitable analysis. As a more particular example, in some embodiments, content server 202 can analyze image content of the video to determine a topic or genre of the video, such as that the video is of a particular type of sport, that the video is from a particular television series, that the video is a music video, that the video includes a particular person or character, and/or any other suitable information. As another more particular example, in some embodiments, content server 202 can analyze audio content of the video to determine a topic or genre of the video, such as that a person in the video is discussing a particular topic, that the video features a band or group playing a particular song or piece, that a particular person is speaking in the video, and/or any other suitable information. In some embodiments, content server 202 can identify any discrepancies between image content and audio content in the video. For example, in instances where the image content includes a person playing a video game while talking about politics, content server 202 can determine that the video is primarily about politics based on the audio content.

Additionally, in some embodiments, content server 202 can analyze any information associated with the media content item, such as comments associated with the media content item, a title of the media content item, creators of the media content item, and/or any other suitable information. For example, in some embodiments, content server 202 can analyze text in comments associated with the media content item to determine a topic of the media content item, and/or any other suitable information.

Content server 202 can determine entities associated with the media content item based on the extracted features at 404. For example, in instances where the media content item is a music video featuring a particular band, content server 202 can determine that the entities include music, a name of the band, a name of a song included in the video, and/or any other suitable information. As another example, in instances where the media content item is an episode of a television show, content server 202 can determine that the entities include a name of the television show, a name of a main character of the television show, a season number and/or an episode number of the television show, a creator of the television show, a channel the television show is typically broadcast on, and/or any other suitable information. Note that, in some embodiments, the entities can be stored in any suitable manner. For example, in some embodiments, the entities can be stored as key-value pairs (e.g., "Group: Band Name," "Show: Television Show Name," and/or any other suitable pairs). Additionally, in some embodiments, entities can be stored in a tree structure. For example, in instances where the media content item is a television show that is a drama, the entities can be stored as "video→television show→drama→show name."

Content server 202 can store the determined entities as metadata at 406. In some embodiments, the metadata can be stored in association with the media content item, for example, in association with an identifier of the media content item. In some embodiments, the metadata can be stored in any suitable file format.

Note that, in some embodiments, content server 202 can perform blocks 402-406 at any suitable time and for any suitable media content items. For example, in some embodiments, content server 202 can iterate through a collection of media content items to extract features of the media content items, determine entities associated with the media content items based on the features, and store the entities as metadata. As another example, in some embodiments, content server 202 can perform blocks 402-406 for a media content item at a time the media content item is uploaded to content server 202. The metadata can then be stored (e.g., in memory 304 of content server 202) for future use, as described below in connection with block 410.

At 408, user device 206 can request a media content item from content server 202. For example, in some embodiments user device 206 can request a media content item to be downloaded from content server 202 and stored in memory 304 of user device 206 that is then available for viewing on user device 206 (e.g., when user device 206 is not connected to content server 202 via communication network 204, and/or at any other suitable time). In some embodiments, user device 206 can request the media content item in any suitable manner. For example, in some embodiments, user device 206 can transmit a request to content server 202 for the media content item in response to receiving a selection of an indication of the media content item via a user interface presented on user device 206.

At 410, content server 202 can transmit the requested media content item to user device 206. The media content item can be transmitted from content server 202 to user device 206 in any suitable manner. For example, in some embodiments, the media content item can be transmitted via communication network 204. Note that, in some embodiments, content server 202 can additionally transmit the metadata corresponding to the media content item to user device 206.

At 412, user device 206 can request that content server 202 cluster one or more media content items stored locally on user device 206. For example, in some embodiments, user device 206 can transmit a request to content server 202 that includes information indicating the media content items to be clustered and/or existing clusters on user device 206, as described in more detail below in connection with block 508 of FIG. 5. Note that, in some embodiments, user device 206 can determine whether a request for a clustering of a group of media content items stored on user device 206 is to be made based on any suitable information, such as a s number of media content items stored on user device 206, as described in more detail below in connection with block 506.

Note that, in some embodiments, user device 206 can request that content server 202 cluster the one or more media content items at any suitable times and/or at any suitable frequencies. For example, in some embodiments, user device 206 can request that content server 202 cluster the one or more media content items when more than a predetermined number of media content items (e.g., more than ten, more than twenty, and/or any other suitable number) have been received since a previous time the media content items were clustered. As another example, in some embodiments, user device 206 can request that content server 202 cluster the one or more media content items when more than a predetermined duration of time (e.g., more than a day, more than a week, and/or any other suitable duration of time) has elapsed since a previous time the media content items were clustered.

At 414, content server 202 can identify a cluster that the media content item belongs to based on the metadata associated with the media content item using any suitable technique or combination of techniques. For example, in some embodiments, content server 202 can identify, for each of the media content items, a category based on the corresponding metadata. As a more particular example, in an instance where a media content item is a particular episode of a television show, the category can be "television show," the name of the television show, a season and episode number of the television show, and/or any other suitable category. As another more particular example, in an instance where a media content item is a cooking show featuring a particular chef, the category can be "cooking," the name of the chef, the name of a cuisine associated with the show episode, and/or any other suitable category. As yet another more particular example, in an instance where a media content item is a video tutorial on a particular topic, the category can be a general topic (e.g., "knitting," "crocheting," and/or any other suitable general topic), a more specific topic associated with the tutorial (e.g., the name of a particular type of knitting stitch, and/or any other suitable topic), the name of a teacher included in the tutorial, and/or any other suitable category.

In some embodiments, content server 202 can identify multiple categories for a particular media content item. For example, in some embodiments, a first category can indicate a general topic associated with the media content item and a second category can indicate a more specific sub-topic of the general topic. As a more particular example, in an instance where a media content item is a cooking show featuring a particular chef, the first category can be "cooking," and the second category can be a name of the chef. As another more particular example, in an instance where the media content item is a video tutorial of a particular knitting stitch, the first category can be "tutorial," and the second category can be "knitting."

In some embodiments, content server 202 can identify the one or more categories based on the metadata using any suitable technique(s). For example, in some embodiments, the one or more categories can be explicitly indicated by the metadata. As a more particular example, in an instance where a media content item is a cooking show featuring a particular chef, the metadata can indicate that the media content item relates to cooking (e.g., a first category or a general topic as described above) and a name of a particular chef (e.g., a second category or a more specific topic as described above). As described above in connection with blocks 404 and 406, the metadata can indicate the categories in any suitable manner. For example, in some embodiments, a general topic and a more specific topic can be indicated as a tree (e.g., first category→second category) and/or in any other suitable manner. Note that, in some embodiments, the one or more categories can be explicitly selected or indicated by a creator of the media content item, for example, at a time when the creator of the media content item uploads the media content item to content server 202. Additionally, note that, in some embodiments, categories corresponding to a media content item can vary based on geographic location. For example, in some embodiments, media content items stored on a user device that belongs to a user living in a particular country can be associated with a particular group of categories, and the same media content items stored on a different user device belonging to a user living in a different country can be associated with a different group of categories.

Content server 202 can cluster the media content items based on the category or categories identified for each media content item. In some embodiments, content server 202 can cluster the media content items into any suitable number of clusters (e.g., one, two, five, ten, and/or any other suitable number). Content server 202 can cluster the media content items using any suitable technique or combination of techniques. For example, in some embodiments, content server 202 can use any suitable clustering algorithm (e.g., K-nearest neighbors, K-means, and/or any other suitable algorithm) to cluster the media content items into clusters based on the categories corresponding to the media content items.

In instances where one or more of the media content items is associated with multiple categories (e.g., a general topic and a sub-topic, two different topics, and/or any other suitable multiple categories), content server 202 can cluster the group of media content items multiple times to determine an optimized clustering. For example, in some embodiments, content server 202 can cluster the group of media content items a first time using a first category associated with each of the media content items and can cluster the group of media content items a second time using a second category associated with each of the media content items. Content server 202 can then determine whether the first group of clusters is a better clustering than the second group of clusters based on any suitable criteria, such as an average number of media content items assigned to each cluster, number of clusters with fewer than a predetermined number of media content items (e.g., fewer than five, fewer than two, fewer than one, and/or any other suitable number). As a more particular example, in instances where a particular media content item belongs to a first category such as "tutorial" and a second category such as "knitting," content server 202 can create a first group of clusters using the first category and determine a number of media content items that belong to a "tutorial" cluster and can create a second group of clusters using the second category and determine a number of media content items that belong to a "knitting" category. Content server 202 can then select either the first group of clusters or the second group of clusters based on, for example, whether there are more than a predetermined number of media content items in the "tutorial" cluster, whether there are fewer than a predetermined number of media content items in the "knitting" cluster, and/or any other suitable metric. As a more particular example, in some embodiments, content server 202 can determine that there are too many media content items in a cluster corresponding to a general topic (e.g., tutorials) and can therefore select the second group of clusters with clusters relating to more specific sub-topics (e.g., knitting). As another more particular example, in some embodiments, content server 202 can determine that there are too few media content items in a cluster corresponding to a specific sub-topic (e.g., knitting) and can therefore select the first group of clusters with clusters relating to more general topics (e.g., tutorials).

Note that, in some embodiments, content server 202 can eliminate or discard any suitable clusters. For example, in some embodiments, content server 202 can eliminate any clusters with fewer than a predetermined number of media content items (e.g., fewer than one, fewer than two, fewer than five, and/or any other suitable number). In some such embodiments, media content items that were assigned to an eliminated cluster can be reassigned to a general cluster, such as a "miscellaneous" cluster. Additionally, note that, in some embodiments, content server 202 can determine that a cluster relating to a general topic or category is to be selected for a first group of media content items (e.g., those relating to tutorials, and/or any other suitable topic) and that a cluster relating to a more specific topic or category is to be selected for a second group of media content items (e.g., those relating to a specific television show or a specific season of a television show, and/or any other suitable sub-topic).

Content server 202 can then transmit a response to user device 206 that indicates the clusters corresponding to the media content items indicated in the request.

At 414, user device 206 can present a user interface that presents indications of the media content items stored on user device 206 organized by cluster. Examples of user interfaces are shown and described above in connection with FIGS. 1A and 1B. In some embodiments, user device 206 can present media content items that have been assigned to the same category or cluster in one portion of the user interface (e.g., within the same row, within the same column, within the same scrolling carousel, and/or in any other suitable portion) and media content items that have been assigned to a different category or cluster in a different portion of the user interface. As described above in connection with FIGS. 1A and 1B, the user interface can include any suitable number of categories and any suitable number of media content items assigned to each category. Additionally, a category or cluster can be of any suitable level of detail, for example, a more general category can include all shows relating to food or cooking, and a more specific category can include shows featuring a particular chef. Additional details for identifying categories are described below in connection with block 508 of FIG. 5.

Figure 5:
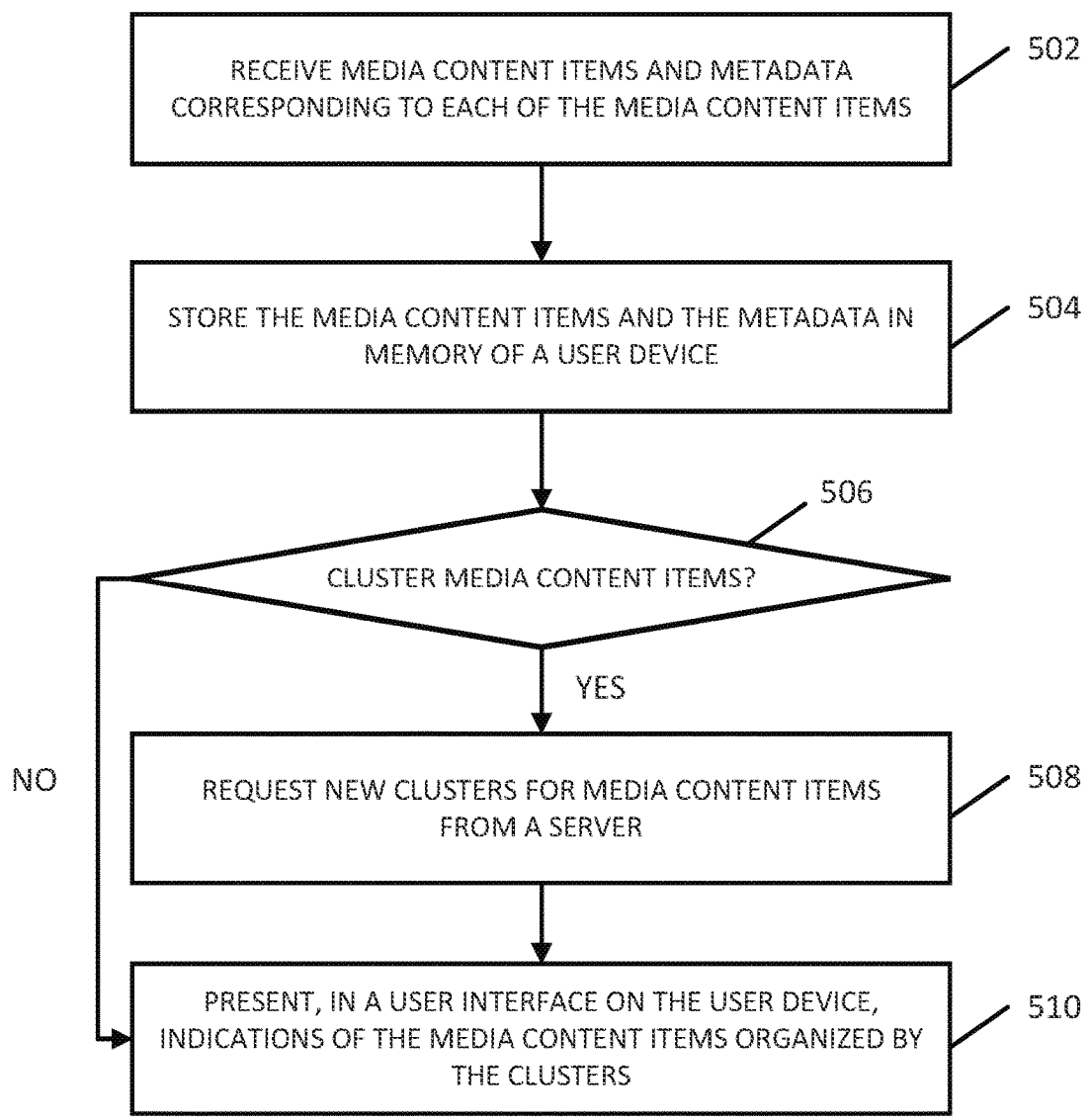
FIG. 5 shows an illustrative example of a process for presenting indications of content items organized by categories in accordance with some embodiments of the disclosed subject matter.

Turning to FIG. 5, an example 500 of a process for clustering media content items based on received metadata is shown in accordance with some embodiments of the disclosed subject matter. In some embodiments, blocks of process 500 can be executed on user device 206.

Process 500 can begin by receiving, at a user device, one or more media content items at 502. As described above in connection with block 410 of FIG. 4, in some embodiments, the one or more media content items can be transmitted from content server 202. Process 500 can receive any suitable number of media content items (e.g., one, two, five, ten, twenty, and/or any other suitable number). For example, in some embodiments, process 500 can receive a group of media content items corresponding to episodes of a television show, a group of media content items in a playlist of media content items, and/or any other suitable group of media content items. As another example, in some embodiments, process 500 can receive a media content item or a group of media content items selected by a user of the user device. In some embodiments, process 500 can receive the media content item or group of media content items in response to receiving a selection of the media content item(s) from a user of the user device.

Process 500 can store the received media content items in local memory of the user device (e.g., memory 304 as shown in and described above in connection with FIG. 3) at 504.

At 506, process 500 can determine whether to request a clustering of media content items stored locally on the user device from a server (e.g., content server 202). In some embodiments, process 500 can determine whether to request the clustering based on any suitable information. For example, in some embodiments, process 500 can determine if more than a predetermined number of media content items (e.g., more than ten, more than twenty, more than thirty, and/or any other suitable number) have been stored locally on the user device. As another example, in some embodiments, process 500 can determine whether more than a predetermined number of media content items (e.g., more than one, more than five, more than ten, and/or any other suitable number) have been added since a previous time the user device requested a clustering of media content items. As yet another example, in some embodiments, process 500 can determine if more than a predetermined number of days (e.g., more than one day, more than five days, and/or any other suitable number) have passed since the user device previously requested a clustering of media content items. As still another example, in some embodiments, process 500 can determine that a language associated with the user device (e.g., a language in which text is presented on the user device) has changed since a previous time the user device requested a clustering of the media content items.

If, at 506, process 500 determines that a clustering of the media content items stored on the user device is to be requested ("yes" at 506), process 500 can transmit a request to the server to cluster one or more media content items indicated in the request at 508. In some embodiments, the request can include any suitable information, such as identifiers of media content items that have been downloaded to the user device since a previous time media content items stored on the user device were clustered. As another example, in some embodiments, the request can indicate existing clusters on the user device (e.g., "television shows," "tutorials," "cooking shows," and/or any other suitable clusters). Additionally, in some embodiments, the request can indicate any media content items that were previously requested to be assigned to a cluster, but that were not assigned to a particular cluster or were assigned to a miscellaneous cluster (e.g., due to not having enough similar media content items on the user device). As described above in connection with block 414 of FIG. 4, process 500 can receive, in response to the request, an indication of clusters for each of the media content items indicated in the request.

Process 500 can then proceed to block 510, and can present a user interface on the user device that indicates the media content items organized by the identified clusters.

If, at 506, process 500 determines that a clustering of the media content items is not to be requested ("no" at 506), process 500 can proceed to block 510 and can present a user interface on the user device that indicates the media content items organized by already existing clusters. Note that, in instances where there are no existing clusters (e.g., in an instance where fewer than a predetermined number of media content items are stored on the user device, and/or in any other suitable instance), process 500 can present indications of the media content items in any suitable manner. For example, in some embodiments, process 500 can present indications of the media content items organized in a list, organized alphabetically based on a name of the media content item, organized by a date the media content item was stored on the user device, and/or in any other suitable manner.

At 510, process 500 can cause a user interface to be presented on the user device that includes indications of the media content items where the indications of the media content items are organized based on the identified clusters. Examples of user interfaces are shown in and described above in connection with FIGS. 1A and 1B. As illustrated in FIGS. 1A and 1B, the clusters indicated in the user interface can be of any suitable level of specificity based on the identified clusters. For example, in some instances, a cluster relating to a general topic can be presented (e.g., as shown in FIG. 1A), and in some instances, a cluster relating to a more specific sub-topic can be presented (e.g., as shown in FIG. 1B).

In some embodiments, the user interface can include selectable inputs that, when selected, cause all of the media content items within a particular cluster to be selected, as shown in and described above in connection with FIG. 1A. In some such embodiments, the user interface can allow any suitable action to be performed on a group of selected media content items, for example, share the selected media content items with a contact (e.g., via a peer-to-peer networking connection, via a social networking service, via an email or text message, and/or in any other suitable manner), delete the selected media content items, move the selected media content items to a different location or folder on the user device, and/or perform any other suitable actions.

Note that, in instances where a selectable input to share selected media content items with a user of another user device is selected, the selected media content items can be transmitted in any suitable manner. For example, in some embodiments, the selected media content items can be transmitted from the first user device on which the media content items were selected to a second user device via an ad-hoc WiFi network, a BLUETOOTH network, audio data (e.g., using audio tones at any suitable frequency), optical data (e.g., using a camera associated with the user devices), and/or in any other suitable manner, as described in more detail above in connection with FIG. 2. In some such embodiments, process 500 can determine a manner in which the selected media content items are to be transmitted based on any suitable information. For example, in some embodiments, process 500 can determine that an ad-hoc WiFi network between the two user devices should be attempted first, and if it is determined that the WiFi network is not of a suitable connection strength or is otherwise not a suitable communication network, process 500 can determine that a BLUETOOTH network should be established between the two user devices. Continuing with this example, in some embodiments, if process 500 determines that the BLUETOOTH network is not a suitable communication network between the two user devices, process 500 can select another manner of communication between the two user devices (e.g., audio data, optical data, Near Field Communication, and/or any other suitable technique). Additionally, note that in instances where the selected media content items are transmitted from the first user device to a second user device, information indicating the clusters to which each selected media content item has been assigned can additionally be transmitted to the second user device, thereby allowing the second user device to use the clustering information to present indications of the received media content items on the second user device.

Note that, in some embodiments, process 500 can save indications of clusters that each media content item is assigned to for future use. For example, in some embodiments, the indications of clusters can be included in the request to the server transmitted at block 508 to allow the server to cluster new media content items into the existing clusters.

In some embodiments, at least some of the above described blocks of the processes of FIGS. 4 and 5 can be executed or performed in any order or sequence not limited to the order and sequence shown in and described in connection with the figure. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for organizing content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for grouping content items, the method comprising:
    downloading, using a user device, a plurality of media content items from a server for offline viewing on the user device;
    determining, using the user device, whether to transmit a request to the server for a clustering of the plurality of media content items based on a local device state of the user device;
    receiving, using the user device, a plurality of clusters corresponding to the plurality of media content items, wherein each of the plurality of media content items is placed in one or more clusters of the plurality of clusters; and
    causing indications of the plurality of media content items to be presented in a user interface on the user device, wherein each of the plurality of media content items are grouped as belonging to a cluster by comparing the number of media content items in each of the plurality of clusters against a threshold number of media content items.

2. The method of claim 1, further comprising, in response to determining that the request for clustering the plurality of media content items is to be transmitted to the server, transmitting the request to the server, wherein the request includes indications of the plurality of media content items.

3. The method of claim 1, wherein each of the plurality of media content items is placed in one or more clusters of a plurality of clusters based on the at least one category and the at least one sub-category indicated in the metadata associated with each of the plurality of media content items, and wherein each cluster of the plurality of clusters includes more than the threshold number of media content items of the plurality of media content items.

4. The method of claim 1, wherein the user interface includes a selectable input to select all media content items of the plurality of media content items assigned to a cluster of the plurality of clusters.

5. The method of claim 1, wherein determining whether to request the clustering of the plurality of media content items is based on whether a number of media content items in the plurality of media content items exceeds a predetermined threshold.

6. The method of claim 1, wherein determining whether to transmit the request to the server for the clustering of the plurality of media content items is based on a duration of time elapsed since a previous clustering of a second plurality of media content items.

7. The method of claim 6, wherein the request includes indications of a second plurality of clusters corresponding to the previous clustering of the second plurality of media content items.

8. A system for grouping content items, the system comprising:
    a memory; and
    a hardware processor that, when executing computer-executable instructions stored in the memory, is configured to:
        download, using a user device, a plurality of media content items from a server for offline viewing on the user device;
        determine, using the user device, whether to transmit a request to the server for a clustering of the plurality of media content items based on a local device state of the user device;
        receive, using the user device, a plurality of clusters corresponding to the plurality of media content items, wherein each of the plurality of media content items is placed in one or more clusters of the plurality of clusters; and
        cause indications of the plurality of media content items to be presented in a user interface on the user device, wherein each of the plurality of media content items are grouped as belonging to a cluster by comparing the number of media content items in each of the plurality of clusters against a threshold number of media content items.

9. The system of claim 8, wherein the hardware processor is further configured to, in response to determining that the request for clustering the plurality of media content items is to be transmitted to the server, transmit the request to the server, wherein the request includes indications of the plurality of media content items.

10. The system of claim 8, wherein each of the plurality of media content items is placed in one or more clusters of a plurality of clusters based on the at least one category and the at least one sub-category indicated in the metadata associated with each of the plurality of media content items, and wherein each cluster of the plurality of clusters includes more than the threshold number of media content items of the plurality of media content items.

11. The system of claim 8, wherein the user interface includes a selectable input to select all media content items of the plurality of media content items assigned to a cluster of the plurality of clusters.

12. The system of claim 8, wherein determining whether to request the clustering of the plurality of media content items is based on whether a number of media content items in the plurality of media content items exceeds a predetermined threshold.

13. The system of claim 8, wherein determining whether to transmit the request to the server for the clustering of the plurality of media content items is based on a duration of time elapsed since a previous clustering of a second plurality of media content items.

14. The system of claim 13, wherein the request includes indications of a second plurality of clusters corresponding to the previous clustering of the second plurality of media content items.

15. A non-transitory computer-readable medium storing computer-executable instructions that, when executed by a hardware processor, cause the processor to perform a method for grouping media content, the method comprising:
    downloading, using a user device, a plurality of media content items from a server for offline viewing on the user device;

determining, using the user device, whether to transmit a request to the server for a clustering of the plurality of media content items based on a local device state of the user device;

receiving, using the user device, a plurality of clusters corresponding to the plurality of media content items, wherein each of the plurality of media content items is placed in one or more clusters of the plurality of clusters; and causing indications of the plurality of media content items to be presented in a user interface on the user device, wherein each of the plurality of media content items are grouped as belonging to a cluster by comparing the number of media content items in each of the plurality of clusters against a threshold number of media content items.

16. The non-transitory computer-readable medium of claim 15, wherein the method further comprises, in response to determining that the request for clustering the plurality of media content items is to be transmitted to the server, transmitting the request to the server, wherein the request includes indications of the plurality of media content items.

17. The non-transitory computer-readable medium of claim 15, wherein each of the plurality of media content items is placed in one or more clusters of a plurality of clusters based on the at least one category and the at least one sub-category indicated in the metadata associated with each of the plurality of media content items, and wherein each cluster of the plurality of clusters includes more than the threshold number of media content items of the plurality of media content items.

18. The non-transitory computer-readable medium of claim 15, wherein the user interface includes a selectable input to select all media content items of the plurality of media content items assigned to a cluster of the plurality of clusters.

19. The non-transitory computer-readable medium of claim 15, wherein determining whether to request the clustering of the plurality of media content items is based on whether a number of media content items in the plurality of media content items exceeds a predetermined threshold.

20. The non-transitory computer-readable medium of claim 15, wherein determining whether to transmit the request to the server for the clustering of the plurality of media content items is based on a duration of time elapsed since a previous clustering of a second plurality of media content items.

21. The non-transitory computer-readable medium of claim 20, wherein the request includes indications of a second plurality of clusters corresponding to the previous clustering of the second plurality of media content items.

* * * * *